(12) United States Patent
Tamekuni et al.

(10) Patent No.: US 9,110,253 B2
(45) Date of Patent: Aug. 18, 2015

(54) OPTICAL CONNECTOR AND METHOD FOR ASSEMBLING OPTICAL CONNECTOR

(75) Inventors: Yoshikyo Tamekuni, Chigasaki (JP); Yuji Suzuki, Chigasaki (JP); Yukihiro Yokomachi, Yokohama (JP)

(73) Assignees: SEI Optifrontier Co., Ltd., Yokohama (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 13/884,885

(22) PCT Filed: Oct. 7, 2011

(86) PCT No.: PCT/JP2011/073197
§ 371 (c)(1), (2), (4) Date: May 10, 2013

(87) PCT Pub. No.: WO2012/090570
PCT Pub. Date: Jul. 5, 2012

(65) Prior Publication Data
US 2013/0230284 A1  Sep. 5, 2013

(30) Foreign Application Priority Data
Dec. 28, 2010  (JP) ................. 2010-293812

(51) Int. Cl.
G02B 6/36 (2006.01)
G02B 6/38 (2006.01)
G02B 6/255 (2006.01)

(52) U.S. Cl.
CPC .............. *G02B 6/3871* (2013.01); *G02B 6/381* (2013.01); *G02B 6/3846* (2013.01); *G02B 6/3869* (2013.01); *G02B 6/2558* (2013.01); *G02B 6/3849* (2013.01); *G02B 6/3887* (2013.01);

(Continued)

(58) Field of Classification Search
CPC .. G02B 6/3893; G02B 6/3869; G02B 6/3825; G02B 6/3879; G02B 6/3898; G02B 6/3871; G02B 6/3894
USPC .................... 385/78, 60, 72; 29/456
See application file for complete search history.

(56) References Cited

U.S. PATENT DOCUMENTS 4,684,205 A * 8/1987 Margolin et al. ............... 385/68
4,737,009 A * 4/1988 Kakii et al. .................... 385/60

(Continued)

FOREIGN PATENT DOCUMENTS

JP  62-21108 A  1/1987
JP  64-080915 A  3/1989

(Continued)

OTHER PUBLICATIONS

English translation of PCT/ISA/237 issued in the counterpart PCT Application No. PCT/JP2011/073197, dated Jan. 10, 2012.

*Primary Examiner* — Ellen Kim
(74) *Attorney, Agent, or Firm* — Global IP Counselors, LLP

(57) ABSTRACT

An optical connector and a method for assembling the optical connector with which the optical connector can be easily assembled are provided. An optical connector includes a ferrule assembly including a ferrule that holds an embedded fiber, a sleeve that holds the ferrule assembly, and a rear housing that is connected to the sleeve and through which an optical fiber that is connected to the embedded fiber is inserted. The ferrule assembly is fixed to the sleeve by threadably engaging a male screw of the ferrule assembly with a female screw of the sleeve.

3 Claims, 12 Drawing Sheets

(52) U.S. Cl.
CPC ............ *G02B 6/3891* (2013.01); *G02B 6/3898* (2013.01); *Y10T 29/49881* (2015.01)

(56) References Cited

U.S. PATENT DOCUMENTS

| | | | |
|---|---|---|---|
| 4,964,688 A * | 10/1990 | Caldwell et al. | 385/56 |
| 5,085,492 A | 2/1992 | Kelsoe et al. | |
| 5,293,582 A * | 3/1994 | Beard et al. | 385/78 |
| 5,761,359 A | 6/1998 | Chudoba et al. | |
| 5,778,122 A * | 7/1998 | Giebel et al. | 385/55 |
| 6,357,932 B1 * | 3/2002 | Auld | 385/76 |
| 6,371,660 B1 * | 4/2002 | Roehrs et al. | 385/59 |
| 6,715,933 B1 * | 4/2004 | Zimmer et al. | 385/86 |
| 6,739,759 B1 * | 5/2004 | Seeley | 385/60 |
| 7,346,256 B2 * | 3/2008 | Marrs et al. | 385/137 |
| 7,614,798 B2 * | 11/2009 | Durrant et al. | 385/55 |
| 7,775,726 B2 * | 8/2010 | Pepin et al. | 385/78 |
| 8,414,196 B2 * | 4/2013 | Lu et al. | 385/60 |
| 2005/0213898 A1 * | 9/2005 | Rubinstein et al. | 385/99 |
| 2008/0279511 A1 * | 11/2008 | Kawasaki et al. | 385/96 |
| 2009/0238523 A1 | 9/2009 | Honma et al. | |
| 2009/0257717 A1 * | 10/2009 | Liu et al. | 385/66 |
| 2010/0209052 A1 * | 8/2010 | Liu et al. | 385/66 |
| 2010/0284653 A1 | 11/2010 | Tamekuni et al. | |
| 2011/0008003 A1 | 1/2011 | Tamekuni et al. | |
| 2011/0286704 A1 * | 11/2011 | Rubinstein et al. | 385/99 |
| 2014/0133804 A1 * | 5/2014 | Lu et al. | 385/60 |

FOREIGN PATENT DOCUMENTS

| | | |
|---|---|---|
| JP | 03-132707 A | 6/1991 |
| JP | 11-287928 A | 10/1999 |
| JP | 2001-201661 A | 7/2001 |
| JP | 2005-091379 A | 4/2005 |
| JP | 2005-519447 A | 6/2005 |
| JP | 2007-334353 A | 12/2007 |
| JP | 2007-334354 A | 12/2007 |
| JP | 2009-069607 A | 4/2009 |
| JP | 2009-271427 A | 11/2009 |
| WO | 03-077000 A1 | 9/2003 |
| WO | 2008-059842 A1 | 5/2008 |
| WO | 2008-059843 A1 | 5/2008 |
| WO | 2009-107306 A1 | 9/2009 |

* cited by examiner (a)

(b)

OPTICAL CONNECTOR AND METHOD FOR ASSEMBLING OPTICAL CONNECTOR

CROSS-REFERENCE TO RELATED APPLICATIONS

This U.S. National stage application claims priority under 35 U.S.C. §119(a) to Japanese Patent Application No. 2010-293812, filed in Japan on Dec. 28, 2010, the entire contents of which are hereby incorporated herein by reference.

TECHNICAL FIELD

The present invention relates to an optical connector and a method for assembling the optical connector.

BACKGROUND ART

Japanese Unexamined Patent Application Publication No. 2007-334353 (PTL 1) describes an ST-type optical connector to which a bayonet for providing connection to an ST-type adaptor is attached. This optical connector includes a tubular member to which a ferrule that holds an embedded fiber is attached and a bayonet (plug housing) to which the tubular member is slidably fitted. A spring is arranged between the tubular member and the bayonet so as to urge the ferrule attached to the tubular member.

Recently, optical connectors have been assembled at external work sites outside dedicated factories. However, it is very difficult to assemble an optical connector according to the related art at the external work sites. This is because although a ferrule (ferrule assembly) and a tubular member (holder) must be connected together to assemble an optical connector according to the related art, it is difficult to fit the ferrule assembly to the holder at the external work sites since the ferrule is small and its characteristics may be degraded by dust or external force.

SUMMARY OF INVENTION

Technical Problem

An object of the present invention is to provide an optical connector and a method for assembling the optical connector with which the optical connector can be easily assembled.

Solution to Problem

An optical connector according to the present invention includes a ferrule assembly including a ferrule that holds an embedded fiber; a ferrule assembly holder that holds the ferrule assembly; and a housing that is connected to the ferrule assembly holder and through which an optical fiber connected to the embedded fiber is inserted. The ferrule assembly is threadably engaged with the ferrule assembly holder.

In the optical connector according to the present invention, preferably, a first screw is formed on the ferrule assembly, a second screw that threadably engages with the first screw is formed on the ferrule assembly holder, and the first screw and the second screw are threadably engaged with each other. In addition, preferably, the ferrule assembly includes, in addition to the ferrule, a flange that is fixed to the ferrule and in which a plurality of recesses are formed at a side adjacent to the ferrule, and a male screw provided on the flange at a side opposite the ferrule.

In addition, according to the present invention, a method for assembling an optical connector including a ferrule assembly including a ferrule that holds an embedded fiber, a ferrule assembly holder that holds the ferrule assembly, and a housing that is connected to the ferrule assembly holder and through which an optical fiber connected to the embedded fiber is inserted, includes a step of fusion-splicing the optical fiber inserted into the housing to the embedded fiber; and a step of threadably engaging the ferrule assembly with the ferrule assembly holder.

Preferably, the method for assembling the optical connector according to the present invention further includes a step of preparing a jig for securing the ferrule assembly, and, in the step of threadably engaging the ferrule assembly with the ferrule assembly holder, the ferrule assembly and the ferrule assembly holder are threadably engaged with each other by securing the ferrule assembly with the jig and rotating the housing that is connected to the ferrule assembly holder.

Advantageous Effects of Invention

According to the present invention, the optical connector can be easily assembled. Therefore, the work efficiency at the work site can be increased.

DESCRIPTION OF EMBODIMENTS

Figure 1:
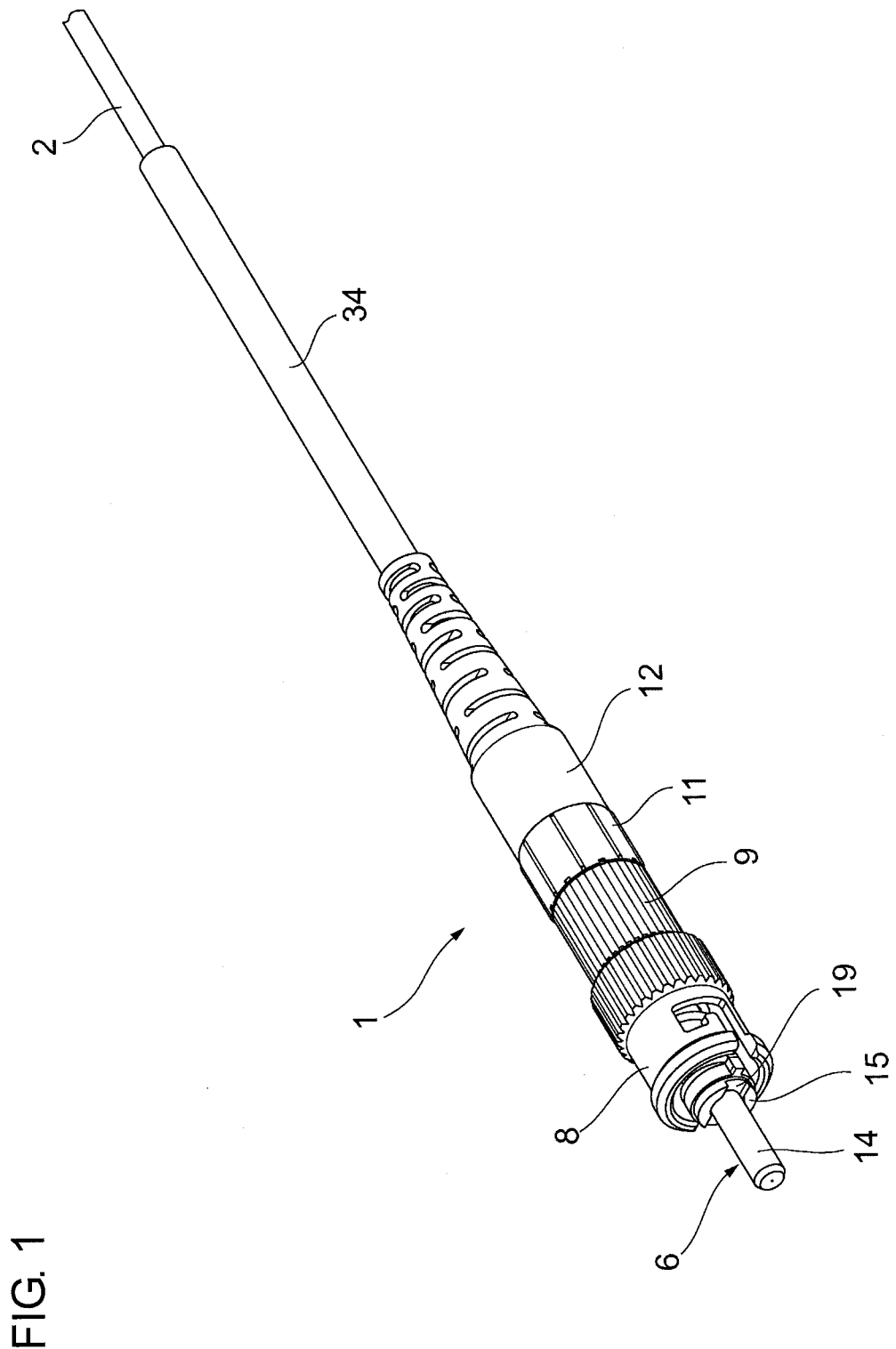
FIG. 1 is a perspective view of an optical connector according to an embodiment of the present invention.

An embodiment of the present invention will now be described with reference to the drawings. The drawings are for illustrative purposes, and are not intended to limit the scope of the invention. To avoid redundancy of explanation, the same components are denoted by the identical reference numerals in the drawings. The dimensional ratios in the drawings are not necessarily exact.

Figure 2:
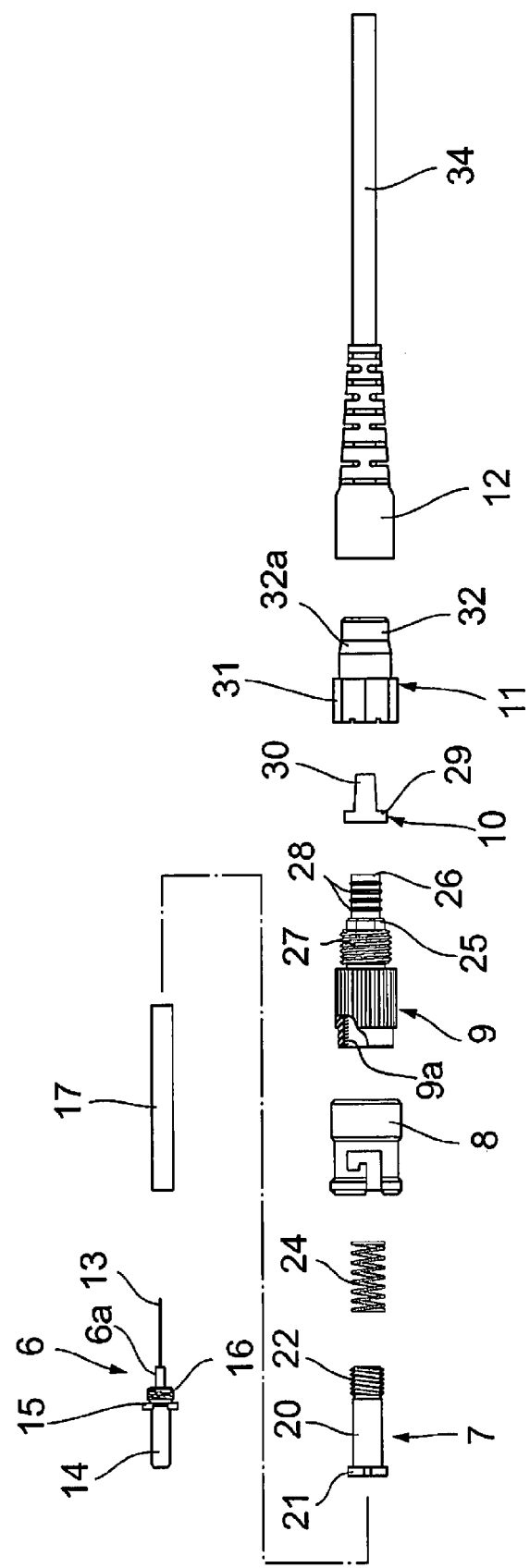
FIG. 2 is an exploded view of the optical connector illustrated in FIG. 1.
Figure 3:
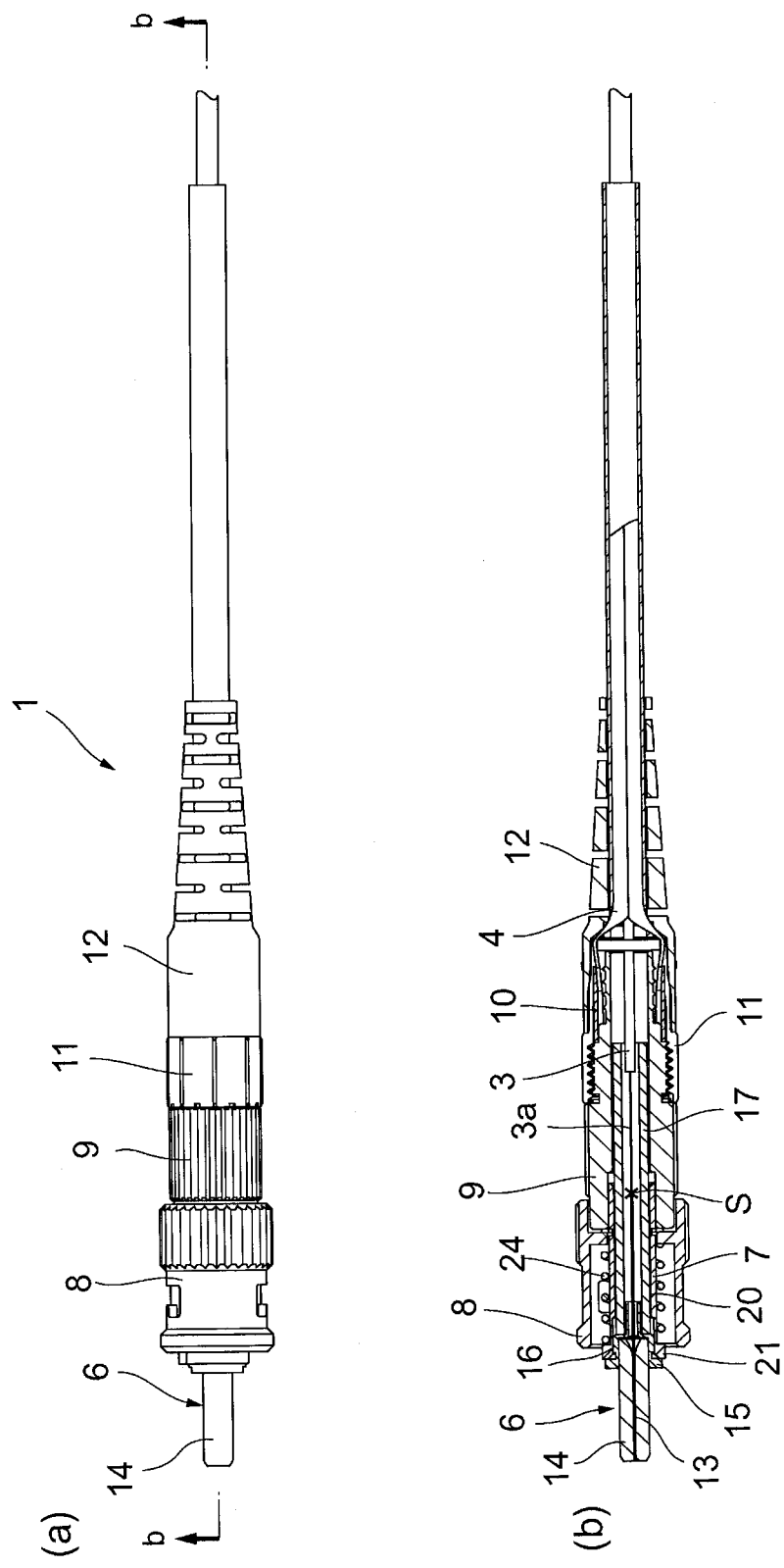
In FIG. 3, region (a) is a side view of the optical connector illustrated in FIG. 1 and region (b) is a sectional view of region (a) taken along line b-b.
Figure 4:
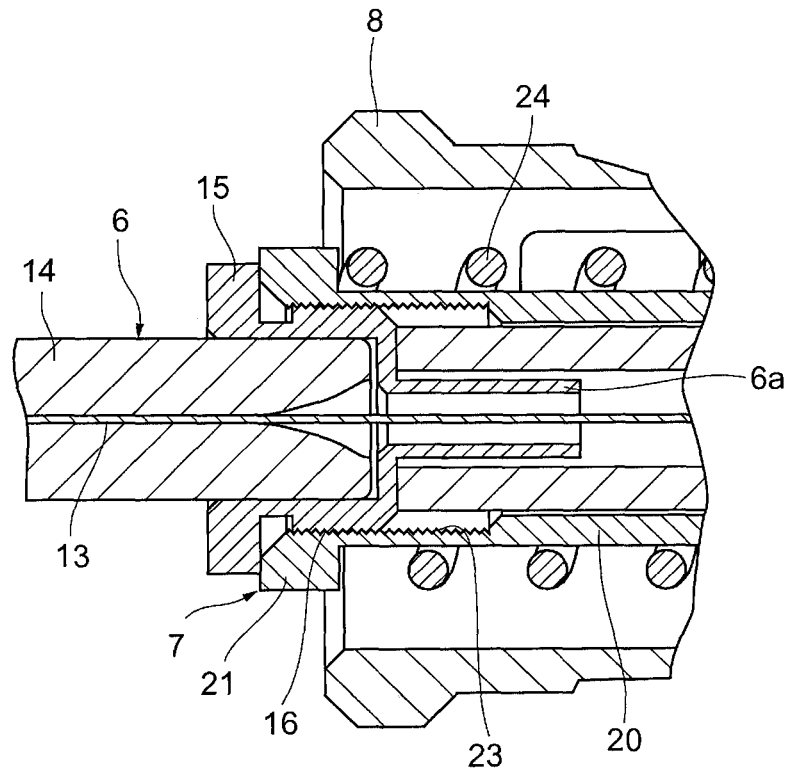
FIG. 4 is an enlarged view of the main part of region (b) of FIG. 3.

FIG. 1 is a perspective view of an optical connector 1 according to an embodiment of the present invention. FIG. 2 is an exploded view of the optical connector 1. In FIG. 3, region (a) is a side view of the optical connector 1. Region (b) is a sectional view of region (a) taken along line b-b. FIG. 4 is an enlarged view of the main part of region (b) of FIG. 3.

The optical connector 1 is a cord-type ST connector to which an optical cord 2 is assembled. The optical cord 2 includes an optical fiber 3, a jacket 4 that covers the optical fiber 3, and tensile resistant fibers (Kevlar) 5 (FIG. 6) that are very thin and that are interposed between the optical fiber 3 and the jacket 4. The tensile resistant fibers 5 are contained in the optical cord 2 while being collected in the form of a bundle.

The optical connector 1 includes a ferrule assembly 6; a sleeve (ferrule assembly holder) 7 that holds the ferrule assembly 6; a plug housing 8 that contains the sleeve 7 and that is to be connected to an ST-type adapter; a rear housing 9 that is connected to a rear end of the plug housing 8 and to which the sleeve 7 is connected; a jacket retaining member 10 and a securing member 11 that are attached to the rear housing 9; and a boot 12 that is attached to the securing member 11.

The ferrule assembly 6 includes a ferrule 14 that holds a short embedded fiber 13, a flange 15 fixed to the ferrule 14, and a male screw (first screw) 16 formed in a region behind the flange 15 (at the side opposite the side at which the ferrule 14 is provided).

The embedded fiber 13 extends rearward from the ferrule assembly 6. An end of the embedded fiber 13 is fusion-spliced to an end of the optical fiber 3 that is exposed by removing a portion of the jacket 4 at an end of the optical cord 2. A fusion-spliced portion S between the embedded fiber 13 and the optical fiber 3 is protected by a fusion protection sleeve 17.

Figure 7:
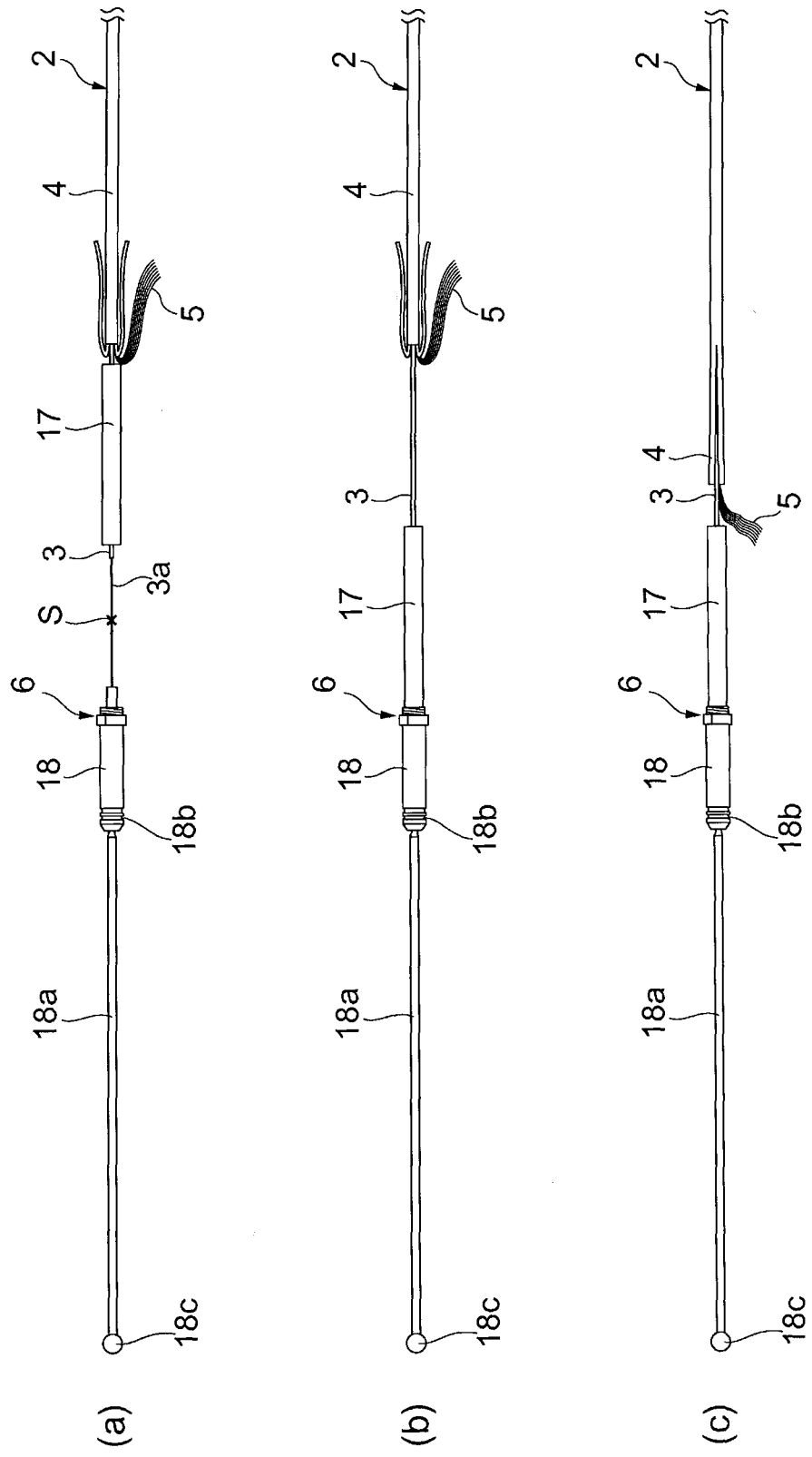
FIG. 7 is a conceptual diagram illustrating steps of the procedure for assembling the optical connector illustrated in FIG. 1.

When the optical connector 1 is not used (when the optical connector 1 is not connected to another optical connector), the ferrule 14 is covered with a dust cap 18 (FIG. 7) for protecting the ferrule 14 from dust and the like. The dust cap 18 has a substantially cylindrical shape. The dust cap 18 is formed of, for example, a thermally stable plastic that does not melt or soften at a high temperature, such as 200° C. An irregular-shaped portion 18b that prevents slipping is formed on an outer peripheral surface of a front portion of the dust cap 18.

Figure 5:
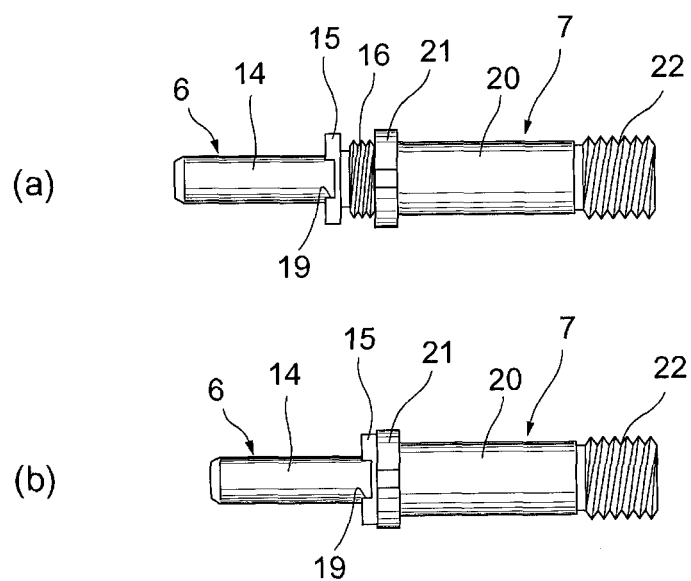
FIG. 5 shows side views of a ferrule assembly and a sleeve that are threadably engaged with each other, wherein region (a) shows a partially engaged state and region (b) shows a completely engaged state.

FIG. 5 shows side views of the ferrule assembly 6 and the sleeve 7 that are threadably engaged with each other. Region (a) shows a partially engaged state and Region (b) shows a completely engaged state. A plurality of recesses 19 (two recesses 19 in this example) are formed in a front surface of the flange 15 by partially cutting the flange 15. The recesses 19 engage with projections 44 of an assembling jig 40, which will be described below. In the ferrule assembly 6, the male screw 16 is formed between a tubular portion 6a, which is provided behind the flange 15, and the flange 15. The male screw 16 threadably engages with a female screw 23 (described below) of the sleeve 7.

The sleeve 7 is a hollow member and retains the ferrule assembly 6. The sleeve 7 includes a tubular portion 20 that has a cylindrical shape and a flange portion 21 that protrudes radially outward at one end of the tubular portion 20. A male screw 22 (a third screw) is formed at the other end of the tubular portion 20. The male screw 22 is threadably engaged with a female screw (a fourth screw) 9a (shown in FIG. 2) is formed on an inner peripheral surface of the rear housing 9. Thus, the sleeve 7 is connected and fixed to the rear housing 9. A female screw (second screw) 23 (FIG. 4) is formed on an inner peripheral surface of the flange portion 21 of the sleeve 7. The female screw 23 threadably engages with the male screw 16 of the ferrule assembly 6.

Referring to FIGS. 1 to 4 again, a spring 24 is arranged between the sleeve 7 and the rear housing 9. The sleeve 7 is inserted through the spring 24, and the spring 24 is arranged between the flange portion 21 of the sleeve 7 and the rear housing 9 in a compressed state.

The rear housing 9 includes a large tubular portion 25 and a small tubular portion 26 that is provided behind the large tubular portion 25. The diameter of the small tubular portion 26 is smaller than the diameter of the large tubular portion 25. A male screw 27 is formed on an outer peripheral surface of the large tubular portion 25. A pair of guide rails (not shown) for guiding the jacket retaining member 10 are formed on an outer peripheral surface of the small tubular portion 26 so as to extend in the front-rear direction. In addition, blade portions 28 for securing the jacket 4 of the optical cord 2 are also formed on the outer peripheral surface of the small tubular portion 26.

The jacket retaining member 10 and the securing member 11 are attached to the rear housing 9. The jacket retaining member 10 includes an annular portion 29 that is fitted to the small tubular portion 26 and a pair of retaining arms 30 that are integrated with the annular portion 29 and extend in the axial direction of the annular portion 29. A pair of projections (not shown) that engage with the respective guide rails on the small tubular portion 26 are formed on an inner peripheral surface of the annular portion 29.

The securing member 11 has a substantially tubular shape. The securing member 11 includes a tensile-resistant-fiber securing portion 31 that secures the tensile resistant fibers 5 to the large tubular portion 25 and a jacket securing portion 32 that is provided behind the tensile-resistant-fiber securing portion 31 and that secures the jacket 4 of the optical cord 2 to the small tubular portion 26 of the rear housing 9 with each of the retaining arms 30.

A female screw (not shown) that threadably engages with the male screw 27 of the large tubular portion 25 is formed on an inner peripheral surface of the tensile-resistant-fiber securing portion 31. A predetermined clearance is provided between the male screw 27 and the female screw so that the tensile resistant fibers 5 can be sandwiched between the large tubular portion 25 and the tensile-resistant-fiber securing portion 31.

The jacket securing portion 32 has a tapered region 32a in which the thickness of the jacket securing portion 32 decreases toward the rear end of the securing member 11. Therefore, an opening diameter of the securing member 11 at the rear end is smaller than an opening diameter of the securing member 11 at the front end, and is also smaller than the outer diameter of the jacket retaining member 10.

A boot 12 is attached to the jacket securing portion 32. The boot 12 protects the optical cord 2 by preventing the optical cord 2 from being sharply bent in a region behind the rear housing 9. A reinforcing tube 34 is attached to the boot 12 in advance.

Next, a procedure for assembling the optical connector 1 will be explained. FIGS. 6, 7, 8, 11, 12, and 13 are conceptual diagrams illustrating steps of the procedure for assembling the optical connector 1. First, the sleeve 7, the spring 24, the plug housing 8, the rear housing 9, the jacket retaining member 10, the securing member 11, and the boot 12 are provisionally assembled and the optical cord 2 is inserted through these components from the rear (from the reinforcing tube 34)

Figure 6:
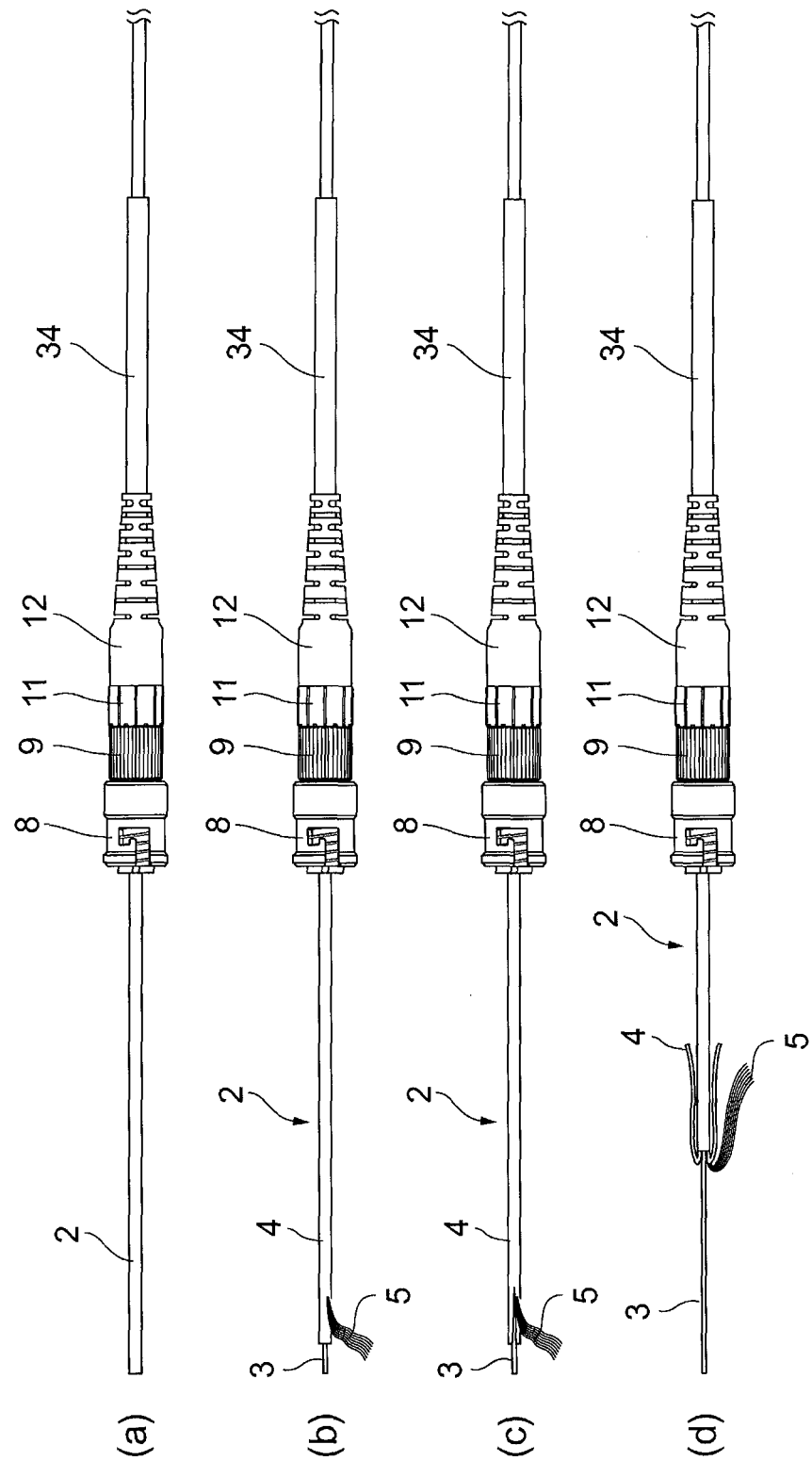
FIG. 6 is a conceptual diagram illustrating steps of a procedure for assembling the optical connector illustrated in FIG. 1.

(Region (a) of FIG. 6). Subsequently, a portion of the jacket 4 at an end of the optical cord 2 is removed so that the optical fiber 3 and the tensile resistant fibers 5 are exposed (Region (b) of FIG. 6). Subsequently, an end portion of the jacket 4 is cut into two bifurcated portions (Region (c) of FIG. 6). Then, the bifurcated portions of the jacket 4 and the tensile resistant fibers 5 are bent over (Region (d) of FIG. 6).

Subsequently, the optical fiber 3 is inserted through the fusion protection sleeve 17. Then, a portion of a fiber coating of the optical fiber 3 at an end of the optical fiber 3 is removed so that a bare fiber 3a is exposed, and the bare fiber 3a is cleaned. Subsequently, an end portion of the optical cord 2 is set to a fiber holder for fusion splicing (not shown). Then, an end portion of the bare fiber 3a is cut. After that, the fiber holder for fusion splicing is set to a fusion splicer (not shown). Subsequently, the ferrule assembly 6 in which the dust cap 18 with a shaft is attached to the ferrule 14 is prepared, and is set to a ferrule holder (not shown). Then, the ferrule holder is set to the fusion splicer (not shown). After that, an end of the embedded fiber 13 and an end of the bare fiber 3a of the optical fiber 3 are fusion-spliced to each other by the fusion splicer (Region (a) of FIG. 7).

Subsequently, the fusion protection sleeve 17 is moved to the position of the fusion-spliced portion S between the embedded fiber 13 and the optical fiber 3. In this state, the fusion protection sleeve 17 is caused to shrink by heating the fusion protection sleeve 17 at about 200° C. (Region (b) of FIG. 7). As a result, the fusion protection sleeve 17 does not move from the position of the fusion-spliced portion S. Then, the jacket 4 and the tensile resistant fibers 5 in the fold back state are returned to their original state (Region (c) of FIG. 7).

Figure 8:
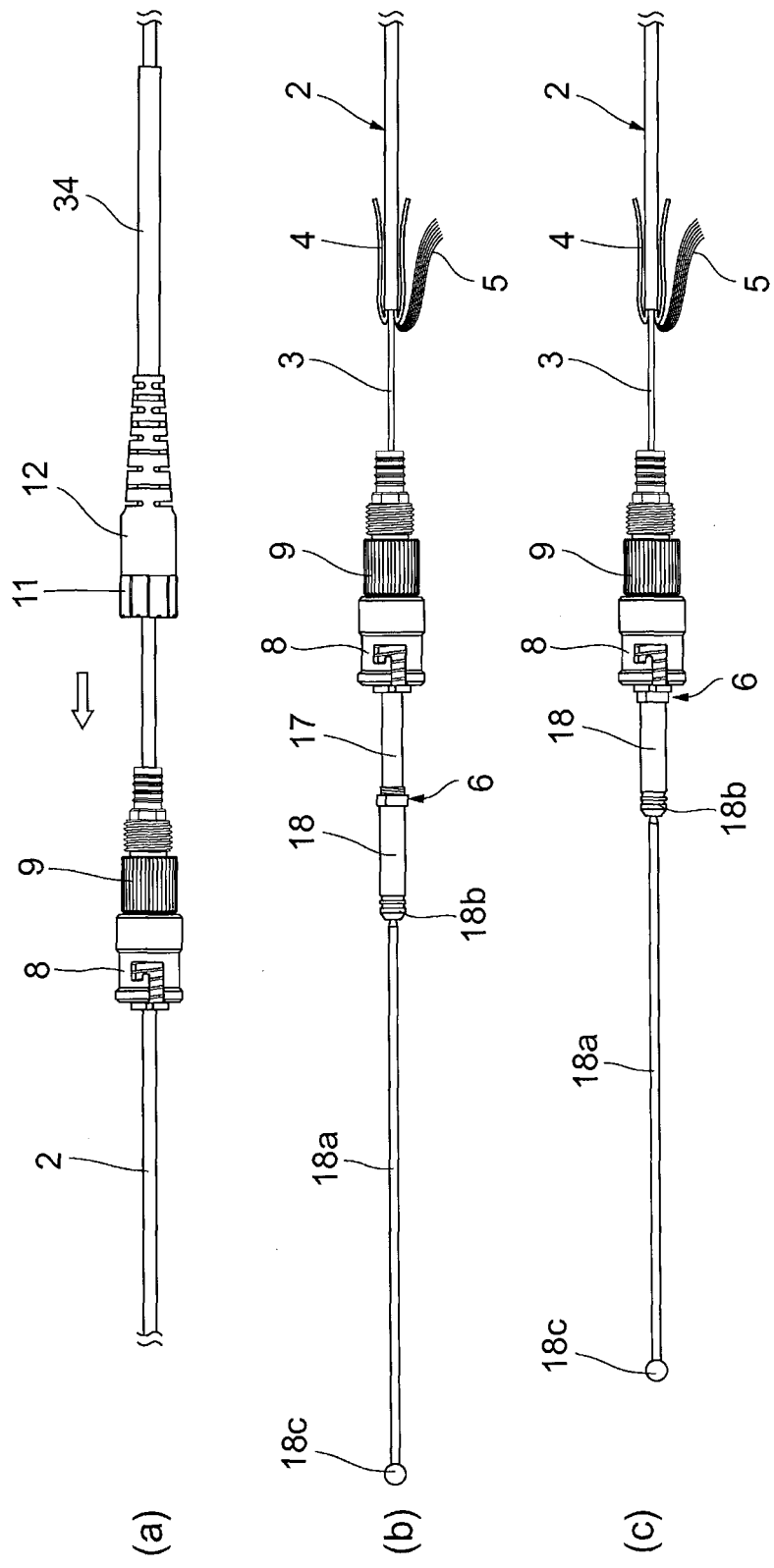
FIG. 8 is a conceptual diagram illustrating steps of the procedure for assembling the optical connector illustrated in FIG. 1.

Subsequently, the rear housing 9 and the securing member 11, which have been provisionally assembled, are separated from each other (Region (a) of FIG. 8). Then, the part including the sleeve 7, the spring 24, the plug housing 8, and the rear housing 9 in the assembled state is moved to the position of the fusion protection sleeve 17 (position of the fusion-spliced portion S between the embedded fiber 13 and the optical fiber 3) (Region (b) of FIG. 8). Then, the male screw 16 of the ferrule assembly 6 and the female screw 23 of the sleeve 7 are threadably engaged with each other (Region (c) of FIG. 8). At this time, the male screw 16 of the ferrule assembly 6 and the female screw 23 of the sleeve 7 are not necessarily completely engaged with each other as long as an end portion of the male screw 16 is threadably engaged with the female screw 23 (Region (a) of FIG. 5).

Figure 9:
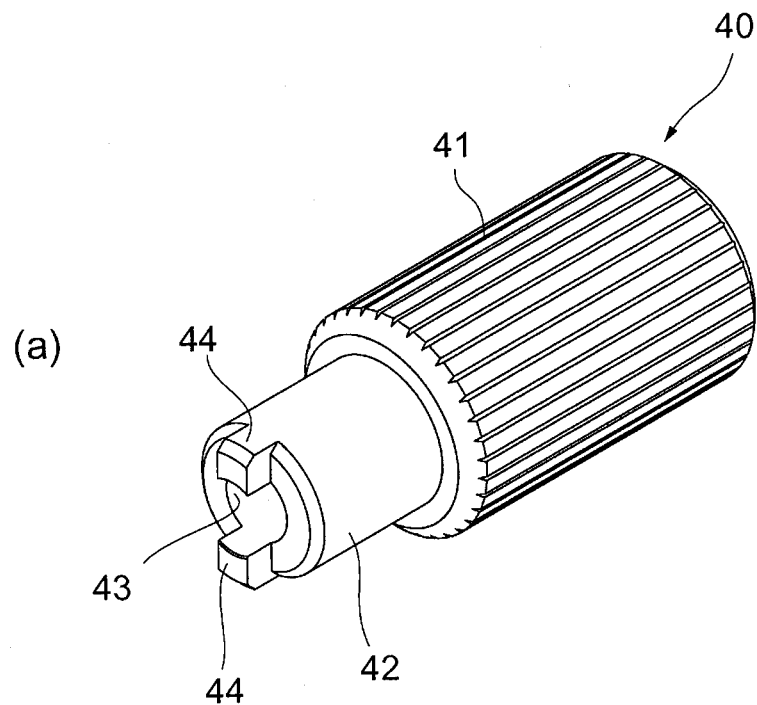
In FIG. 9, regions (a) and (b) are a perspective view and a top view, respectively, of an assembling jig.
Figure 9:
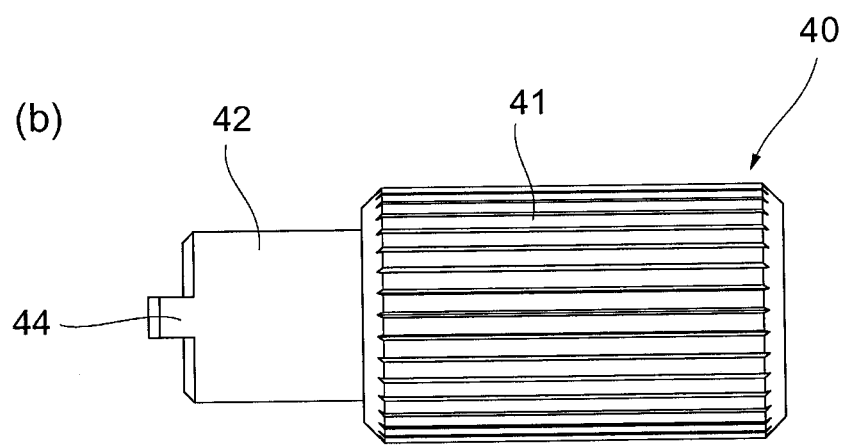
Figure 10:
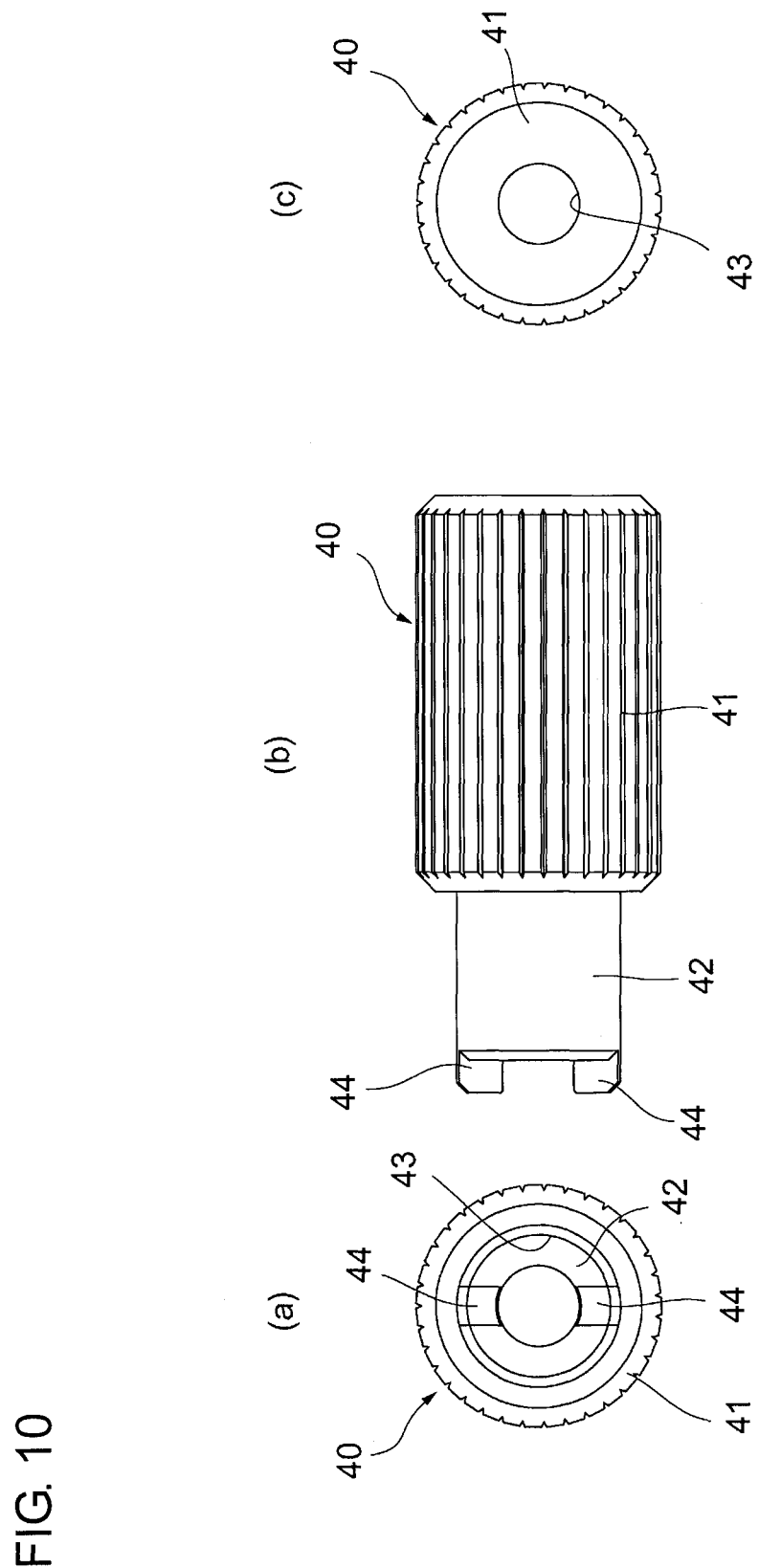
In FIG. 10, regions (a), (b), and (c) are a front view, a side view, and a rear view, respectively, of the assembling jig.

Subsequently, the assembling jig 40 is prepared. Regions (a) and (b) of FIG. 9 and regions (a), (b), and (c) of FIG. 10 are a perspective view, a top view, a front view, a side view, and a rear view, respectively, of the assembling jig 40. The assembling jig 40 includes a main body portion 41 having a cylindrical shape and a small-diameter portion 42 that is provided at one end of the main body portion 41 and that has a diameter smaller than that of the main body portion 41. The main body portion 41 and the small-diameter portion 42 have a through hole 43 formed therein. The through hole 43 has an opening diameter that is greater than the diameter of the dust cap 18. Accordingly, the dust cap 18 can be inserted through the assembling jig 40. The main body portion 41 has a plurality of grooves that extend in the axial direction. These grooves have a function of preventing slipping.

An end face (front end face) of the small-diameter portion 42 is chamfered at the outer peripheral side thereof. A plurality of projections 44 (two projections 44 in this example) are formed so as to project from the front end face of the small-diameter portion 42. The projections 44 engage with the recesses 19 formed in the flange 15 of the ferrule assembly 6. The projections 44 are chamfered at the outer peripheral side of the small-diameter portion 42. This allows the projections 44 of the assembling jig 40 to smoothly engage with the recesses 19 formed in the flange 15 of the ferrule assembly 6. The number of projections 44 corresponds to the number of recesses 19 formed in the flange 15 of the ferrule assembly 6.

Figure 11:
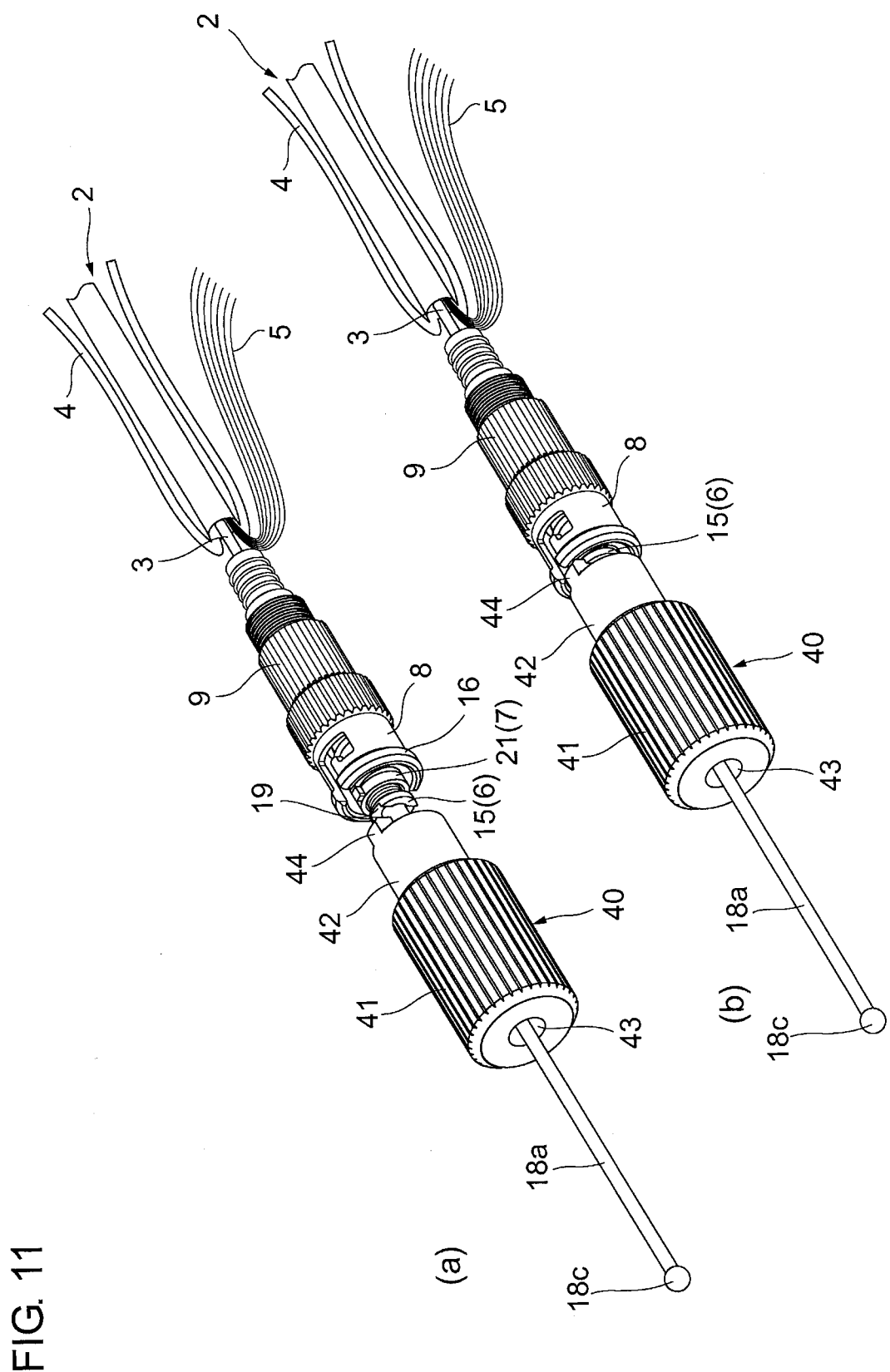
FIG. 11 is a conceptual diagram illustrating steps of the procedure for assembling the optical connector illustrated in FIG. 1.

The dust cap 18 attached to the ferrule 14 is inserted through the assembling jig 40 from a terminal end 18c thereof (Region (a) of FIG. 11). The assembling jig 40 is moved to the flange 15 of the ferrule assembly 6 while the dust cap 18 is inserted therethrough, and the projections 44 are caused to engage with the recesses 19 in the flange 15. Then, the rear housing 9, to which the sleeve 7 is connected, is rotated while the assembling jig 40 is secured so that the male screw 16 of the ferrule assembly 6 and the female screw 23 of the sleeve 7 are completely threadably engaged with each other (Region (b) of FIG. 11). At this time, the ferrule assembly 6 and the sleeve 7 are completely threadably engaged with each other, as illustrated in region (b) of FIG. 5. Thus, the ferrule assembly 6 is positioned and is retained by and fixed to the sleeve 7.

Figure 12:
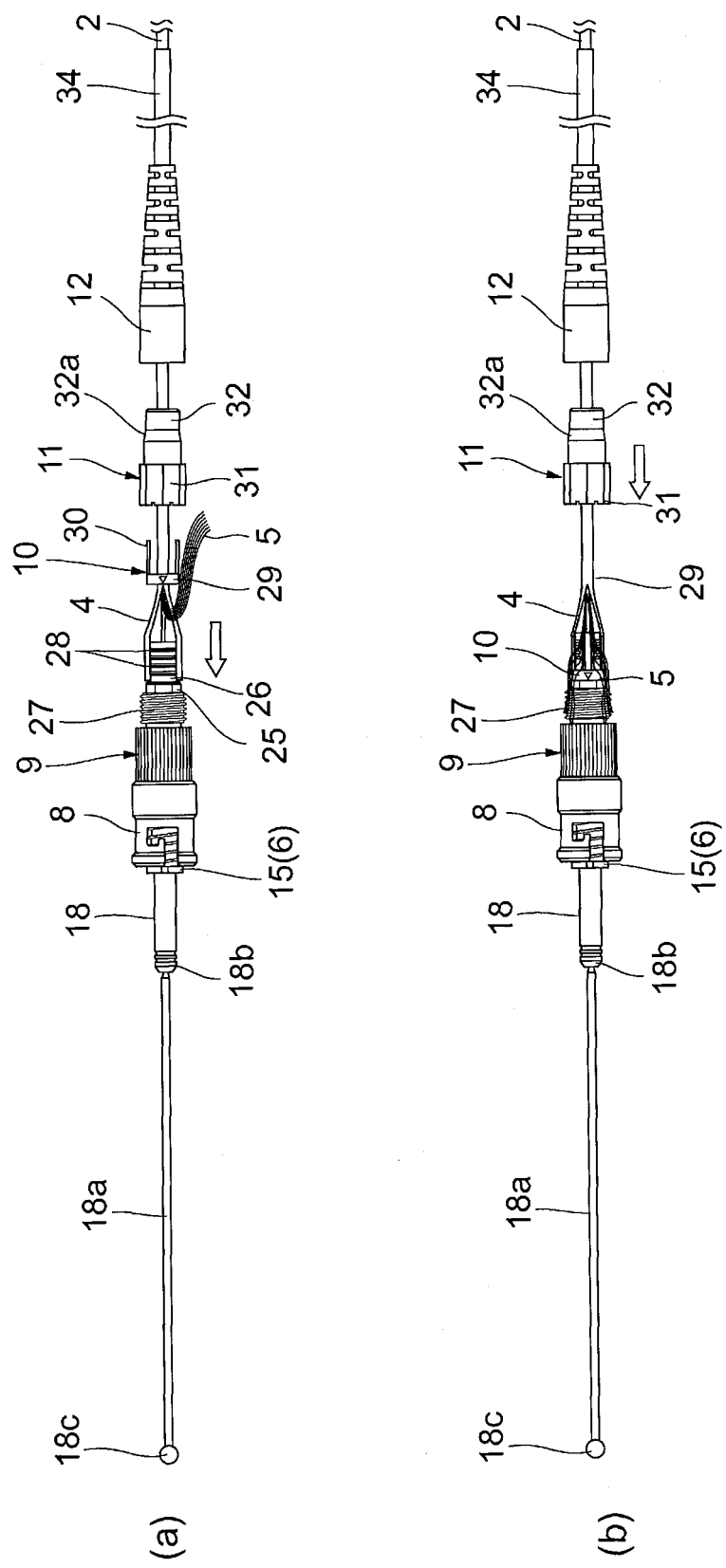
FIG. 12 is a conceptual diagram illustrating steps of the procedure for assembling the optical connector illustrated in FIG. 1.

Subsequently, the bifurcated portions of the jacket 4 are placed on the blade portions 28 of the small tubular portion 26 of the rear housing 9 (Region (a) of FIG. 12). Then, the jacket retaining member 10 is fitted to the small tubular portion 26 while the jacket 4 are placed on the blade portions 28 of the small tubular portion 26 of the rear housing 9 (Region (b) of FIG. 12). Accordingly, the blade portions 28 bite into the jacket 4.

Figure 13:
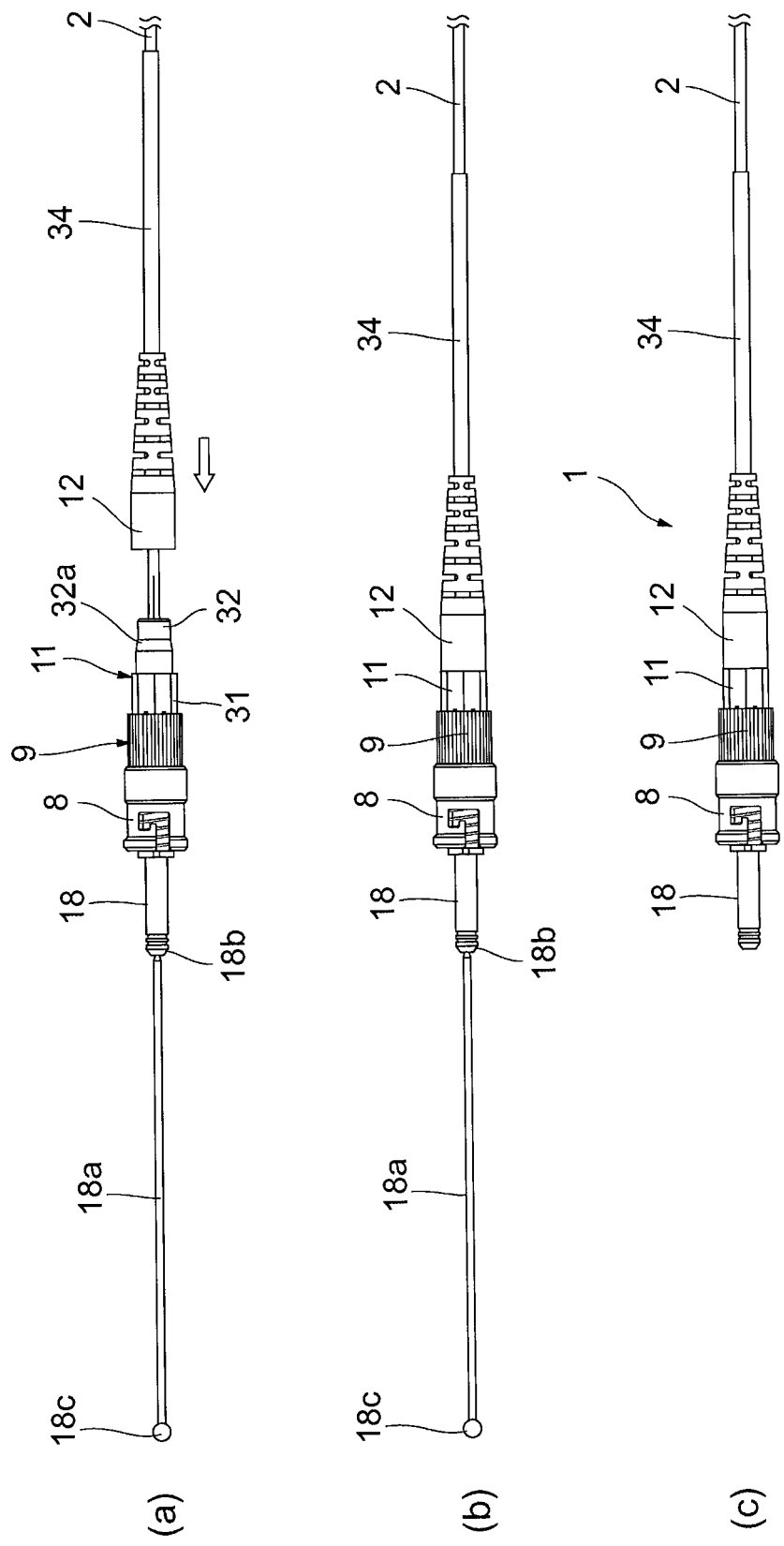
FIG. 13 is a conceptual diagram illustrating steps of the procedure for assembling the optical connector illustrated in FIG. 1.

Subsequently, the securing member 11 is screwed onto the large tubular portion 25 of the rear housing 9 while the tensile resistant fibers 5 are placed on the large tubular portion 25 (Region (a) of FIG. 13). Accordingly, the tensile resistant fibers 5 are secured by being sandwiched between the large tubular portion 25 and the tensile-resistant-fiber securing portion 31.

In addition, the small tubular portion 26 of the rear housing 9 is covered by the jacket securing portion 32 of the securing member 11. Since the jacket securing portion 32 has the tapered region 32a in which the thickness of the jacket securing portion 32 decreases toward the rear end of the securing member 11, each of the retaining arms 30 of the jacket retaining member 10 is pushed by the jacket securing portion 32 and bent toward the small tubular portion 26. Accordingly, the bifurcated portions of the jacket 4 are strongly secured by being sandwiched between the jacket securing portion 32 and the small tubular portion 26 with each retaining arm 30.

Subsequently, the boot 12 to which the reinforcing tube 34 is attached is attached to the jacket securing portion 32 of the securing member 11 (Region (b) of FIG. 13). Then, a shaft portion 18a of the dust cap 18 with the shaft is cut with fingers. By performing the above-described steps, the optical connector 1 illustrated in FIG. 1 is completed (Region (c) of FIG. 13).

As described above, in the optical connector 1, the male screw 16 of the ferrule assembly 6 is threadably engaged with the female screw 23 of the sleeve 7. Thus, the ferrule assembly 6 is fixed to the sleeve 7. Therefore, a process of fitting the ferrule assembly 6 to the sleeve 7, which has been difficult in a connector according to the related art, can be easily performed. The ferrule assembly 6 can be fixed to the sleeve 7 by threadably engaging the male screw 16 of the ferrule assembly 6 with the female screw 23 of the sleeve 7. Thus, the optical connector 1 can be easily assembled at a work site.

With the above-described structure, the optical connector 1 can be easily assembled at a work site by preparing two packages at the work site, the two packages including a package in which the ferrule assembly 6 having the dust cap 18 attached to the ferrule 14 and the fusion protection sleeve 17 are enclosed and a package in which a part obtained by provisionally assembling the sleeve 7, the spring 24, the plug housing 8, the rear housing 9, the jacket retaining member 10, the securing member 11, and the boot 12 is enclosed.

When the assembling jig 40 is used to threadably engage the ferrule assembly 6 and the sleeve 7 to each other, the male screw 16 of the ferrule assembly 6 and the female screw 23 of the sleeve 7 can be reliably threadably engaged with each other. Accordingly, the ferrule assembly 6 can be accurately positioned and securely fixed to the sleeve 7.

The present invention is not limited to the above-described embodiment. For example, although an ST connector is described in the above-described embodiment, the structure of the present invention can be applied to any connector as long as the connector includes members corresponding to the ferrule assembly and the ferrule assembly holder.

CITATION LIST

Non Patent Literature

PTL 1: Japanese Unexamined Patent Application Publication No. 2007-334353

The invention claimed is:

1. An optical connector comprising:
a ferrule assembly including a ferrule that holds an embedded fiber and a flange that is fixed to the ferrule, the ferrule assembly having a first screw provided on the flange at a side opposite the ferrule;
a ferrule assembly holder that holds the ferrule assembly, the ferrule assembly holder having a second screw provided at one end and on an inner peripheral surface of the ferrule assembly holder and a third screw provided at the other end of the ferrule assembly holder;
a plug housing that contains the ferule assembly holder and is to be connected to an adapter; and
a rear housing that is connected to the ferrule assembly holder and a rear end of the plug housing and through which an optical fiber connected to the embedded fiber is inserted, the rear housing having a fourth screw provided on an inner peripheral surface of the rear housing,
wherein the ferrule assembly and the ferrule assembly holder are fixed in a manner where the first screw and the second screw are threadably engaged with each other, the flange and the ferrule assembly abut one another, and the ferrule assembly holder and the rear housing are connected in a manner where the third screw and the fourth screw are threadably engaged with each other.

2. The optical connector according to claim 1, wherein the flange has a plurality of recesses being formed at a side adjacent to the ferrule.

3. A method for assembling an optical connector comprising:
providing a ferrule assembly including a ferrule that holds an embedded fiber with a flange that is fixed to the ferrule and in which a plurality of recesses are formed at a side adjacent to the ferrule, the ferrule assembly having a first screw provided on the flange at a side opposite the ferrule, a ferrule assembly holder that holds the ferrule assembly, the ferrule assembly holder having a second screw provided at one end and on an inner peripheral surface of the ferrule assembly holder and the third screw provided at the other end of the ferrule assembly holder, and a rear housing that is connected to the ferrule assembly holder and through which an optical fiber connected to the embedded fiber is inserted fusion-splicing the optical fiber inserted through the plug housing to the embedded fiber, the rear housing having a fourth screw provided on an inner peripheral surface of the rear housing;
connecting the ferrule assembly holder and the rear housing in a manner where the third screw and the fourth screw are threadably engaged in each other;
fusion-splicing the optical fiber inserted through the rear housing to the embedded fiber;
providing a jig for assembling the ferrule assembly, the jig having a plurality of projections;
threadably attaching the ferrule assembly to the ferrule assembly holder by rotating the ferrule assembly using the jig with the projections of the jig engaging the recesses in the flange and threadably engaging first screw and the second screw to each other such that the flange and the ferrule assembly holder abut each other.

* * * * *